US012499842B2

(12) United States Patent
Keum et al.

(10) Patent No.: US 12,499,842 B2
(45) Date of Patent: Dec. 16, 2025

(54) SCAN DRIVER AND DISPLAY DEVICE INCLUDING THE SAME

(71) Applicant: Samsung Display Co., Ltd., Yongin-Si (KR)

(72) Inventors: Nackhyeon Keum, Yongin-si (KR); Kyung-Hoon Kim, Yongin-si (KR); Minjoo Kim, Yongin-si (KR); Jeonghun Bang, Yongin-si (KR); Donghwan Jeon, Yongin-si (KR)

(73) Assignee: Samsung Display Co., Ltd., Yongin-Si (KR)

(*) Notice: Subject to any disclaimer, the term of this patent is extended or adjusted under 35 U.S.C. 154(b) by 0 days.

(21) Appl. No.: 18/792,555

(22) Filed: Aug. 2, 2024

(65) Prior Publication Data

US 2025/0069556 A1 Feb. 27, 2025

(30) Foreign Application Priority Data

Aug. 21, 2023 (KR) ........................ 10-2023-0109313
Jan. 4, 2024 (KR) ........................ 10-2024-0001265

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0819* (2013.01); *G09G 2300/0842* (2013.01); *G09G 2300/0861* (2013.01); *G09G 2310/0286* (2013.01); *G09G 2310/08* (2013.01); *G09G 2330/021* (2013.01)

(58) Field of Classification Search
CPC ............... G09G 3/3266; G09G 3/3233; G09G 2300/0819; G09G 2300/0842; G09G 2300/0861; G09G 2310/0286; G09G 2310/08; G09G 2330/021
See application file for complete search history.

(56) References Cited

U.S. PATENT DOCUMENTS 11,715,408 B1 * 8/2023 Zhang .................... G11C 19/28 345/55
2009/0058781 A1 * 3/2009 Xu ......................... G11C 19/28 345/92
2020/0152127 A1 * 5/2020 Kang ................... G09G 3/3225

FOREIGN PATENT DOCUMENTS

CN 116645996 A * 8/2023

* cited by examiner

Primary Examiner — Stephen G Sherman
(74) *Attorney, Agent, or Firm* — Innovation Counsel LLP

(57) ABSTRACT

Each stage of a scan driver includes a first control transistor connected between a first input terminal and a first node to operate in response to a clock signal, a second control transistor connected between a second input terminal and a second node to operate in response to the clock signal, a third control transistor connected between the first node and a first control node to operate in response to a first voltage provided through a first voltage terminal, a fourth control transistor connected between a second voltage terminal and a second control node to operate in response to potential at the first node, a fifth control transistor connected between the second control node and the first voltage terminal to operate in response to a potential at the second node, and a first capacitor connected between the second node and the second control node.

20 Claims, 9 Drawing Sheets

SCAN DRIVER AND DISPLAY DEVICE INCLUDING THE SAME

CROSS-REFERENCE TO RELATED APPLICATIONS

This application claims priority under 35 U.S.C. § 119 to Korean Pat. App. No. 10-2023-0109313, filed Aug. 21, 2024, and Korean Pat. App. No. 10-2024-0001265, filed Jan. 4, 2024, the disclosures of which are incorporated by reference herein in their entireties.

BACKGROUND

Embodiments of the present disclosure described herein relate to a scan driver and a display device including the same, and more particularly, relate to a scan driver with a simplified circuit structure and a display device including the same.

An emissive-type display device may use a light emitting diode that generates a light through the recombination of electrons and holes. Such emissive-type display devices may provide rapid response speeds and lower power consumption.

An emissive-type display device may include a display panel having pixels disposed in an active region. Each pixel typically includes at least one light emitting diode and a pixel circuit unit to control current flowing through the light emitting diodes. Each pixel circuit unit may be connected to a data line to receive a data signal and a scan line to receive a scan signal. The pixel circuit unit may control the quantity of current, in response to the data signal, such that the current flows from a first driving voltage to a second driving voltage via the light emitting diode. In this case, the light emitting diode produces light having specific brightness that corresponds to the quantity of current flowing through the light emitting diode.

SUMMARY

Embodiments of the present disclosure may provide a scan driver having a simplified circuit structure and may reduce power consumption in a display device including the scan driver.

According to an embodiment, a scan driver includes a plurality of stages sequentially connected to each other. Each stage includes a first control transistor connected between a first input terminal and a first node to operate in response to a clock signal provided through a clock terminal, a second control transistor connected between a second input terminal and a second node to operate in response to the clock signal, a third control transistor connected between the first node and a first control node to operate in response to a first voltage provided through a first voltage terminal, a fourth control transistor connected between a second voltage terminal and a second control node to operate in response to a potential at the first node, a fifth control transistor connected between the second control node and the first voltage terminal to operate in response to a potential at the second node, a first capacitor connected between the second node and the second control node, and an output circuit configured to output a scan signal in response to a potential at the first control node and a potential at the second control node.

According to an embodiment, a display device includes a display panel including a pixel, a data driver configured to output a data signal to the display panel, and a scan driver including a plurality of stages sequentially connected to each other to output a scan signal to the display panel.

According to an embodiment, each stage includes a first control transistor connected between a first input terminal and a first node to operate in response to a clock signal provided through a clock terminal, a second control transistor connected between a second input terminal and a second node to operate in response to the clock signal, a third control transistor connected between the first node and a first control node to operate in response to a first voltage provided through a first voltage terminal, a fourth control transistor connected between a second voltage terminal and a second control node to operate in response to a potential at the first node, a fifth control transistor connected between the second control node and the first voltage terminal to operate in response to a potential at the second node, a first capacitor connected between the second node and the second control node, and an output circuit configured to output a scan signal in response to a potential at the first control node and a potential at the second control node.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
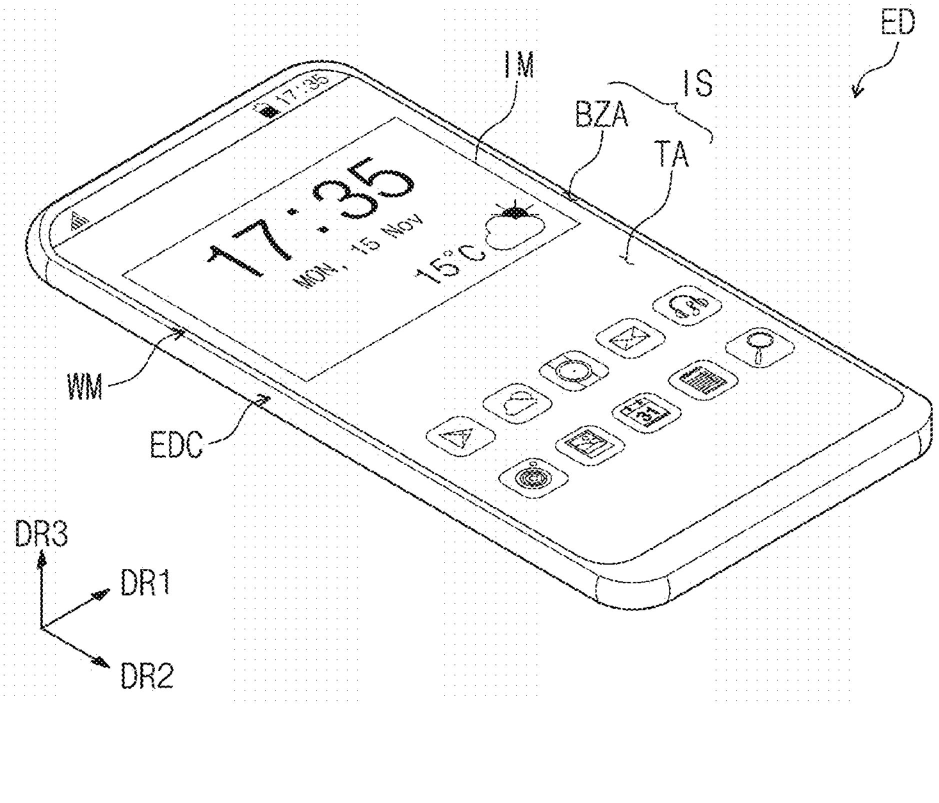
FIG. 1 is a perspective view of an electronic device according to an embodiment of the present disclosure.

The present disclosure describes example embodiments with reference to accompanying drawings. In the description, a first component (or region, layer, part, portion, etc.) referred to as being "on", "connected to", or "coupled to" a second component means that the first component may be directly on, connected to, or coupled to the second component or means that a third component may interposed between the first component and the second component.

The same reference numeral used in different figures and in this disclosure refer the same component. In addition, in drawings, thicknesses, proportions, and dimensions of components may be exaggerated or altered to better illustrate technical features effectively.

Although the terms "first," "second," etc. may be used to describe various components, the components should not be construed as being limited by such terms. These terms are only used to distinguish one component from another component. For example, without departing from the scope and spirit of the present disclosure, a first component may be referred to as a second component, and similarly, the second component may be referred to as the first component.

In addition, terms such as "under," "at a lower portion," "above," and "an upper portion" are used to describe the relationship between components illustrated in drawings. The terms are relative and are described with reference to a direction indicated in the drawing.

It will be further understood that the terms "comprises," "comprising," "includes," or "including," or "having" specify the presence of stated features, numbers, steps, operations, components, parts, or the combination thereof, but do not preclude the presence or addition of one or more other features, numbers, steps, operations, components, components, and/or the combination thereof. The term "and/or" includes any and all combinations of one or more of associated components. The singular forms are intended to include the plural forms unless the context clearly indicates otherwise.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology and should not be interpreted in ideal or overly formal meanings unless explicitly defined herein.

Hereinafter, embodiments of the present disclosure will be described with reference to accompanying drawings.

FIG. 1 is a perspective view of an electronic device ED according to an embodiment of the present disclosure. The electronic device ED may be a device activated in response to an electrical signal. The electronic device ED may be employed in various applications or uses. For example, the electronic device ED may be an electronic device, such as a smartphone, a smart watch, a tablet PC, a laptop computer, a computer, a smart television (TV), or a navigation system.

Referring to FIG. 1, according to an embodiment of the present disclosure, an electronic device ED may have a shape of a rectangle having a shorter side parallel to a first direction DR1 and a longer side parallel to a second direction DR2 crossing the first direction DR1. However, an embodiment is not limited thereto, and the electronic device ED may have various shapes such as a circle or a polygon.

Hereinafter, a direction substantially normal to a plane defined by the first direction DR1 and the second direction DR2 is defined as a third direction DR3. In the specification the meaning of "when viewed in a plan view" may refer to "when viewed in the third direction DR3".

A top surface of the electronic device ED may be defined as a display surface IS and may be parallel to the plane defined by the first direction DR1 and the second direction DR2. Images IM generated by the electronic device ED may be provided to a user through the display surface IS.

The display surface IS may be divided into a transmission region TA and a bezel region BZA. The transmission region TA may be an area in which the images IM is displayed. A user views the images IM through the transmission region TA. In the example shown in FIG. 1, the transmission region TA has rounded corners. However, the shape of the transmission region TA shown in FIG. 1 is provided for the illustrative purpose. More generally, the transmission region TA may have various shapes, and not limited to the shapes shown in the drawings.

The bezel region BZA is adjacent to the transmission region TA. The bezel region BZA may have a specific or fixed color. The bezel region BZA may surround the transmission region TA. Accordingly, the shape of the transmission region TA may substantially be defined by the bezel region BZA. However, the above shape of the bezel region BZA is merely provided as an example. Alternatively, for example, the bezel region BZA may be disposed adjacent to only one side of the transmission region TA or may be omitted.

The electronic device ED may sense an external input applied from outside the electronic device ED. The external input may include various types of inputs provided from the outside of the electronic device ED. For example, an external input may be a contact on the display surface IS of a part, such as a hand, of a user's body, or the external input may result from the user hand approaching the electronic device ED or being close to the electronic device ED within a given distance. In addition, the external input may have various types such as force, pressure, a temperature, and a light.

Figure 2A:
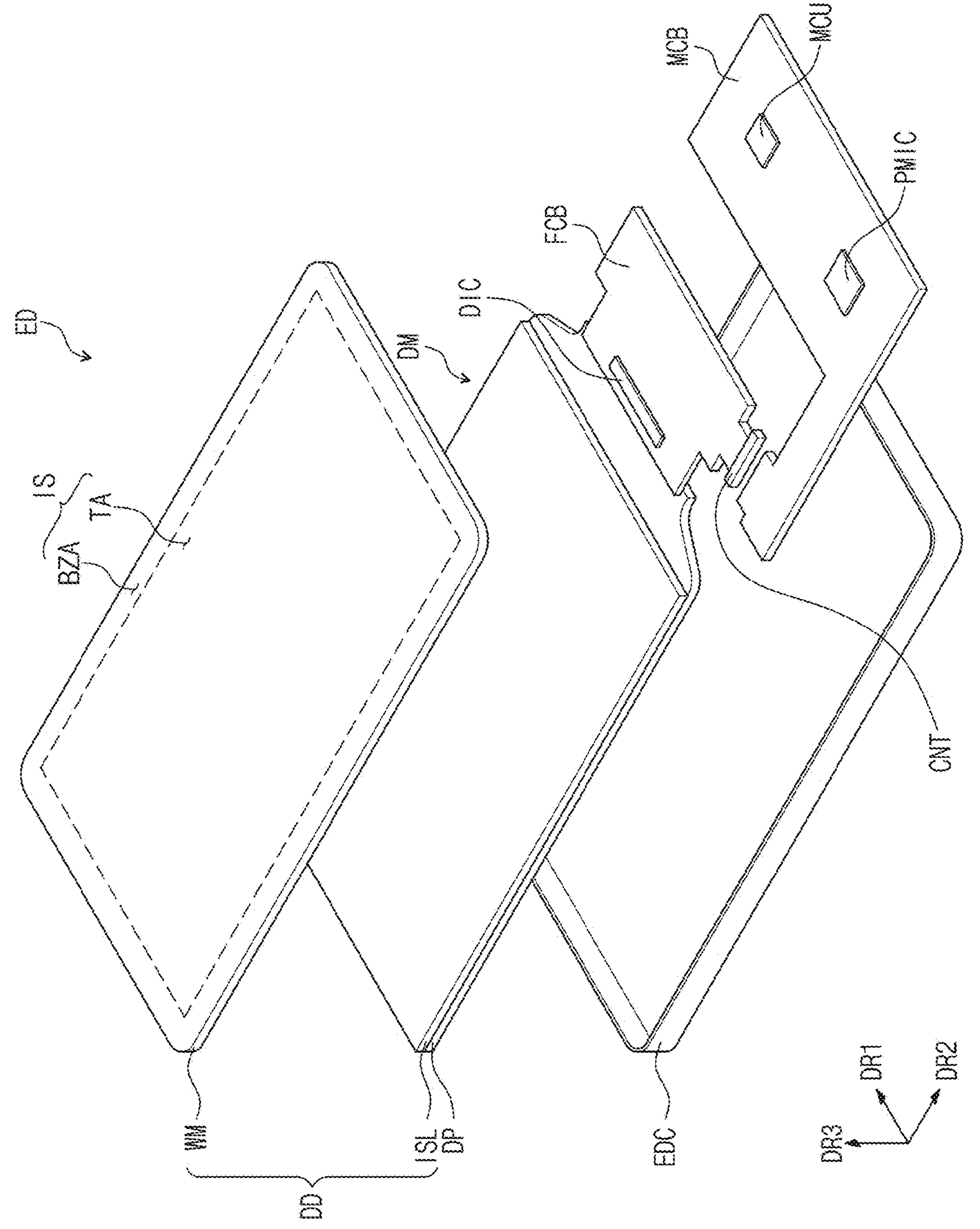
FIG. 2A is an exploded perspective view of an electronic device according to an embodiment of the present disclosure.
Figure 2B:
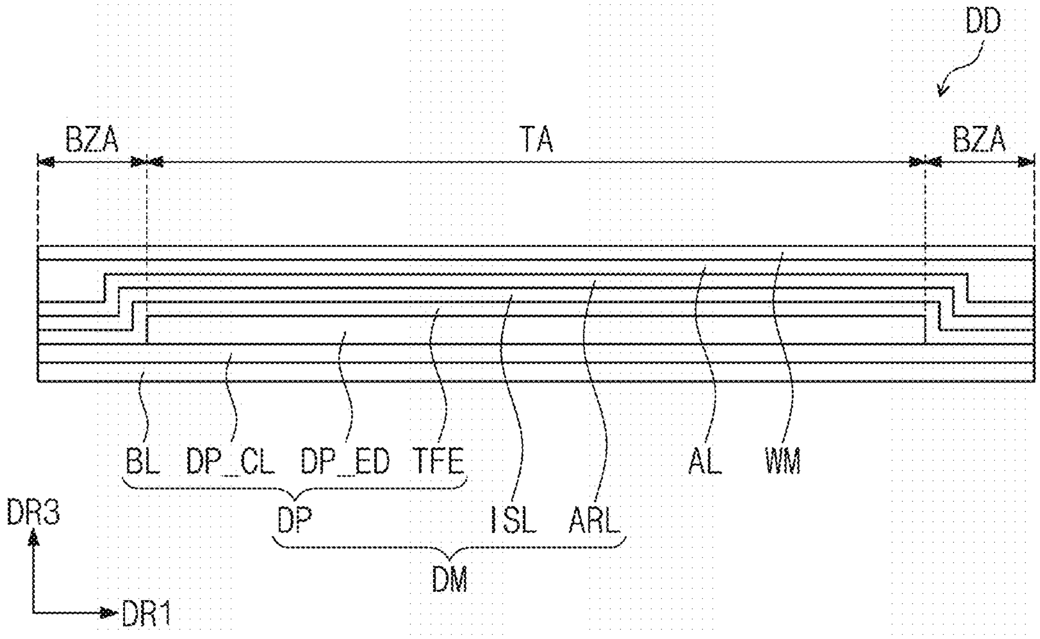
FIG. 2B is a cross-sectional view of a display device according to an embodiment of the present disclosure.

FIG. 2A is an exploded perspective view of an electronic device, according to an embodiment of the present disclosure, and FIG. 2B is a cross-sectional view of a display device, according to an embodiment of the present disclosure.

Referring to FIGS. 2A and 2B, the electronic device ED may include a display device DD, an electronic module, and a housing EDC. The display device DD may include a window WM and a display module DM and may be received in the housing EDC. According to an embodiment, the window WM is coupled to the housing EDC to form an outer appearance of the electronic device ED.

The front surface of the window WM may define the display surface IS of the electronic device ED. The window WM may include an optically transparent insulating material. For example, the window WM may include glass or plastic. The window WM may have a multi-layer structure or a single-layer structure. For example, the window WM may include a plurality of plastic films coupled to each other through an adhesive agent or may include a glass substrate and a plastic film coupled to each other through the adhesive agent.

The display module DM may include a display panel DP and an input sensing layer ISL. The display panel DP may display an image in response to an electrical signal, and the input sensing layer ISL may sense the external input applied from the outside the electronic device ED. The external input may be provided in various forms as described above.

According to an embodiment of the present disclosure, the display panel DP may be an emissive-type display panel, but the present disclosure is not limited to a particular type of display panel. For example, the display panel DP may be or include an organic light emitting display panel, an inorganic light emitting display panel, or a quantum-dot light emitting display panel. An organic light emitting display panel may include an organic light emitting material as a light emitting layer, and an inorganic light emitting display panel may include an inorganic light emitting material as the light emitting layer. A quantum dot light emitting display panel may include a quantum dot and a quantum rod in the light emitting layer. Hereinafter, the following description focuses on an embodiment in which the display panel DP is an organic light emitting display panel.

Referring to FIG. 2B, the display panel DP includes a base layer BL, a circuit layer DP_CL, an element layer DP_ED, and an encapsulating layer TFE. The display panel DP according to the present disclosure may be a flexible display panel. However, the present disclosure is not limited thereto. For example, the display panel DP may be a foldable display panel, which is folded about to a folding axis, or may be a rigid display panel.

The base layer BL may include a synthetic resin layer. The synthetic resin layer may be a polyimide-based resin layer. Alternatively or additionally, the base layer BL may include a glass substrate, a metal substrate, or an organic/inorganic composite substrate.

The circuit layer DP_CL is disposed on the base layer BL. The circuit layer DP_CL may be interposed between the base layer BL and the element layer DP_ED. The circuit layer DP_CL includes at least one insulating layer and structure forming a circuit element. Hereinafter, the insulating layer included in the circuit layer DP_CL may be referred to as an intermediate insulating layer. The intermediate insulating layer may include at least one intermediate inorganic film and at least one intermediate organic film. The circuit element may include a pixel driving circuit included in each of a plurality of pixels to display an image and a sensor driving circuit included in each of a plurality of sensors to sense or recognize external information. The external information may be biometric information. According to an embodiment of the present disclosure, each of the sensors may include a fingerprint recognizing sensor, a proximity sensor, an iris recognizing sensor, a blood measuring sensor, or an illuminance sensor. In addition, each of the sensors may be an optical sensor that optically recognizes biometrics information. The circuit layer DP_CL may further include signal lines connected to a pixel driving circuit and/or a sensor driving circuit.

The element layer DP_ED may include one or more light emitting element for each pixel and one or more light receiving element for each of the sensors. The light receiving element may be a sensor to sense light, e.g., light reflected from the fingerprint of the user, or a sensor that otherwise reacts with light. According to an embodiment of the present disclosure, each light receiving element may be a photodiode.

The encapsulating layer TFE encapsulates the element layer DP_ED. The encapsulating layer TFE may include at least one organic film and at least one inorganic film. The inorganic film may include an inorganic material to protect the element layer DP_ED from moisture/oxygen. The inorganic film may include a silicon nitride layer, a silicon oxynitride layer, a silicon oxide layer, a titanium oxide layer, or an aluminum oxide layer, but the present disclosure is not limited thereto. The organic layer may include an organic material and may protect the element layer DP_ED from foreign substances such as dust particles.

The input sensing layer ISL may be formed on the display panel DP. The input sensing layer ISL may be directly disposed on the encapsulating layer TFE. According to an embodiment of the present disclosure, the input sensing layer ISL may be formed on the display panel DP through a series of subsequent processes. In other words, when the input sensing layer ISL is directly disposed on the display panel DP, an adhesive film is not interposed between the input sensing layer ISL and the encapsulating layer TFE. Alternatively, the adhesive film may be interposed between the input sensing layer ISL and the display panel DP. In this case, the input sensing layer ISL and the display panel DP may not be fabricated through subsequent processes. In other words, after fabricating the input sensing layer ISL through a process separate from a process forming the display panel DP, the input sensing layer ISL may be fixed on a top surface of the display panel DP through the adhesive film.

The input sensing layer ISL may sense the external input (e.g., a touch of the user), may change the sensed input into a specific input signal, and may provide the input signal to the display panel DP. The input sensing layer ISL may include a plurality of sensing electrodes to sense an external input. The sensing electrodes may sense the external input using a capacitive type of sensing to generate an input signal. The display panel DP may receive an input signal from the input sensing layer ISL and may generate an image corresponding to the input signal.

The display module DM may further include an anti-reflective layer ARL. The anti-reflective layer ARL may reduce the reflectivity of the display device DD for external light that is incident from an upper side of the window WM. According to an embodiment of the present disclosure, the anti-reflective layer ARL may be disposed on the input sensing layer ISL. However, the present disclosure is not limited thereto. The anti-reflective layer ARL may alternatively be interposed between the display panel DP and the input sensing layer ISL. The anti-reflective layer ARL may include a plurality of color filters and a black matrix. The arrangement of the color filters may be determined based on colors of light generated from a plurality of pixels PX (see FIG. 3) included in the display panel DP. The anti-reflective layer ARL may include a retarder and a polarizer. The retarder may be a film type or a liquid crystal coating type and may include a λ/2 retarder and/or a λ/4 retarder. The polarizer may also be a film type or a liquid crystal coating type. The film type polarizer may include a stretched synthetic resin film, and the liquid crystal coating type polarizer may include liquid crystals arranged in a specific array. The retarder and the polarizer may be implemented within one polarization film.

According to an embodiment of the present disclosure, the display device DD may further include an adhesive layer AL. The window WM may be attached to the anti-reflective layer ARL through the adhesive layer AL. The adhesive layer AL may include an optically clear adhesive, an optically clear adhesive resin, or a pressure sensitive adhesive (PSA).

The display module DM may further include a display driving circuit DIC (or a display driving chip) and a flexible circuit film FCB. According to an embodiment of the present disclosure, the display driving circuit DIC may be a chip and may be mounted on the flexible circuit film FCB. However, the present disclosure is not limited thereto. Alternatively, the display driving circuit DIC may be disposed on the display panel DP.

The flexible circuit film FCB may be coupled to the display panel DP. The flexible circuit film FCB may be coupled to an end portion of the display panel DP to electrically connect the display driving circuit DIC to the display panel DP.

The display module DM may further include a touch driving circuit that is mounted on the flexible circuit film FCB and electrically connected to the input sensing layer ISL.

The electronic module may include a main circuit board MCB. According to an embodiment of the present disclosure, the main circuit board MCB may be electrically connected to the flexible circuit film FCB through a connector CNT. A main processor MCU and a power managing circuit PMIC (or a power managing chip) may be provided on the main circuit board MCB. The main processor MCU and the power managing circuit PMIC may be electrically connected to the display driving circuit DIC through the connector CNT.

The main processor MCU may control the overall operation of the electronic device ED. The main processor MCU may include at least one of a central processing unit (CPU) or an application processor (AP). The main processor MCU may further include at least one of a graphic processing unit (GPU), a communication processor (CP), or an image signal processor (ISP). The main processor MCU may provide to the display driving circuit DIC an image signal and various control signals necessary for displaying an image.

The power managing circuit PMIC may receive external power (for example, a battery voltage), and the power managing circuit PMIC may generate a voltage to be supplied to the display device DD, based on the external power. The power managing circuit PMIC may include at least one regulator. The at least one regulator may use the external power to generate and output driving voltage having various voltage levels.

Although FIG. 2A illustrates an embodiment in which the power managing circuit PMIC is a chip mounted on the main circuit board MCB, the present disclosure is not limited thereto. For example, the power managing circuit PMIC may be a component included in the display device DD, for example, a chip mounted on the flexible circuit film FCB.

The electronic module may further include various functional modules, for example, a camera module, or a sensor module, in addition to the main circuit board MCB, the main processor MCU, and the power managing circuit PMIC.

The housing EDC may be assembled with the window WM. The housing EDC may be coupled to the window WM to provide a specific inner space. The inner space of the housing EDC may receive and contain the display device DD and the electronic module. The housing EDC may be made of a material having a higher rigidity. For example, the housing EDC may include glass, plastic, or metal or may include a plurality of frames and/or plates that are composed of a combination thereof. The housing EDC may stably protect components of the display device DD and the electronic module from an external impact.

Although not illustrated, a battery module to supply power necessary for an overall operation of the display device DD may be interposed between the display module DM and the housing EDC.

Figure 3:
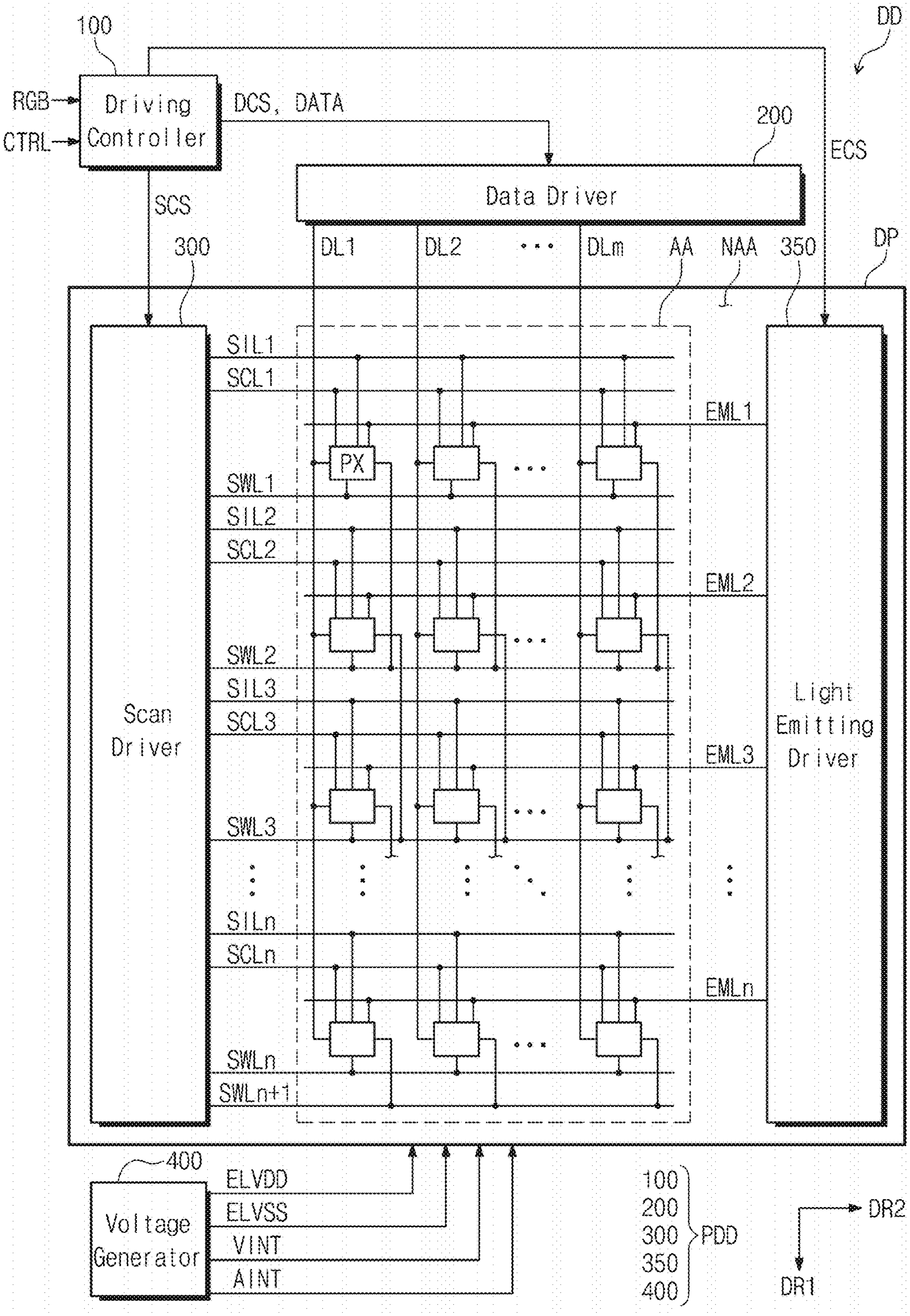
FIG. 3 is a block diagram of a display device according to an embodiment of the present disclosure.

FIG. 3 is a block diagram of a display device DD according to an embodiment of the present disclosure.

The display device DD includes the display panel DP, a panel driver PDD to drive the display panel DP, and a voltage generator 400. According to an embodiment of the present disclosure, the panel driver PDD may include a driving controller 100, a data driver 200, a scan driver 300, and a light emitting driver 350

The driving controller 100 receives an input image signal RGB and a control signal CTRL from a host processor. According to an embodiment of the present disclosure, the host processor may be a graphic processing unit (GPU). The driving controller 100 generates image data DATA by transforming a data format of the input image signal RGB as needed to comply with the interface specification of the data driver 200. The control signal CTRL may include a vertical synchronization signal, a data enable signal, or a master clock signal. The driving controller 100 may also generate a first driving control signal SCS, a second driving control signal DCS, and a third driving control signal ECS, in response to the control signal CTRL.

The data driver 200 receives the second driving control signal DCS and the image data DATA from the driving controller 100. The data driver 200 converts the image data DATA into data signals and then outputs the data signals to a plurality of data lines DL1 to DLm, which are further described below. In this case, "m" may be an integer equal to or greater than '1'. The data signals may be analog voltages corresponding to grayscale values of the image data DATA.

The scan driver 300 receives the first driving control signal SCS from the driving controller 100. The scan driver 300 may output scan signals to scan lines, in response to the first driving control signal SCS.

The voltage generator 400 generates voltages necessary for an operation of the display panel DP. According to an embodiment, the voltage generator 400 generates a first driving voltage ELVDD, a second driving voltage ELVSS, a first initialization voltage VINT, and a second initialization voltage AINT.

The display panel DP may include an active region AA and an inactive region NAA. The active region AA may be defined as a region (i.e., a region where the image IM (refer to FIG. 1) is displayed) through which the image IM is output from the display panel DP. The inactive area NAA may be a region in which the image IM is not substantially displayed. The display panel DP includes initialization scan lines SIL1 to SILn, compensating scan lines SCL1 to SCLn, write scan lines SWL1 to SWLn+1, light emitting control lines EML1 to EMLn, the data lines DL1 to DLm, and the pixels PX. In this case, 'n' may be an integer equal to or greater than '1'. The initialization scan lines SIL1 to SILn, the compensating scan lines SCL1 to SCLn, the write scan lines SWL1 to SWLn+1, the light emitting control lines EML1 to EMLn, the data lines DL1 to DLm, and the pixels PX may overlap or be disposed in the active region AA of the display panel DP. The initialization scan lines SIL1 to SILn, the compensating scan lines SCL1 to SCLn, the write scan lines SWL1 to SWLn+1, and the light emitting control lines EML1 to EMLn may extend in the second direction DR2. The initialization scan lines SIL1 to SILn, the compensating scan lines SCL1 to SCLn, the write scan lines SWL1 to SWLn+1, and the light emitting control lines EML1 to EMLn may be arranged to be spaced apart from each other in the first direction DR1. The data lines DL1 to DLm are arranged to be spaced apart from each other in the second direction DR2 while extending in the first direction DR1.

The plurality of pixels PX are electrically connected to the initialization scan lines SIL1 to SILn, the compensating scan lines SCL1 to SCLn, the write scan lines SWL1 to SWLn+1, the light emitting control lines EML1 to EMLn, and the data lines DL1 to DLm, respectively. Each of the pixels PX may be electrically connected to four scan lines. For example, as illustrated in FIG. 3, the pixels included in a first row may be connected to the first initialization scan line SIL1, the first compensating scan line SCL1, and the first and second write scan lines SWL1 and SWL2. For example, the pixels included in a second row may be connected to the second initialization scan line SIL2, the second compensating scan line SCL2, and the second and third write scan lines SWL2 and SWL3. However, the number of scan lines, which are connected to each pixel PX is not limited to four, but the number of scan lines connected to each pixel PX may be varied. Alternatively, each of the plurality of pixels PX may be electrically connected to five scan lines. In this case, the display panel DP may further include black scan lines.

The scan driver 300 may be disposed in the inactive region NAA of the display panel DP. The scan driver 300 may receive the first driving control signal SCS from the driving controller 100. The scan driver 300 may output initialization scan signals to the initialization scan lines SIL1 to SILn, output compensation scan signals to the compensating scan lines SCL1 to SCLn, and output write scan signals to the write scan lines SWL1 to SWLn+1, in response to the first driving control signal SCS. The circuit configuration and the operation of the scan driver 300 is described in more detail below.

The light emitting driver 350 receives the third driving control signal ECS from the driving controller 100. The light emitting driver 350 may output light emitting control signals to light emitting control lines, in response to the third driving control signal ECS. In the embodiment illustrated in FIG. 3, the scan driver 300 is connected to the light emitting control lines EML1 to EMLn. In this case, the scan driver 300 may output light emitting control signals to the light emitting control lines EML1 to EMLn.

Each of the pixels PX may include a light emitting element ED (see FIG. 4) and a pixel circuit unit PXC (see FIG. 4) to control to emit light from the light emitting element ED. Each pixel circuit unit PXC may include a plurality of transistors and at least one capacitor. The scan driver 300 and the light emitting driver 350 may include transistors formed through the same process that forms the pixel circuit units PXC.

Each of the plurality of pixels PX receives the first driving voltage ELVDD, the second driving voltage ELVSS, the first initialization voltage VINT, and the second initialization voltage AINT from the voltage generator 400.

Figure 4:
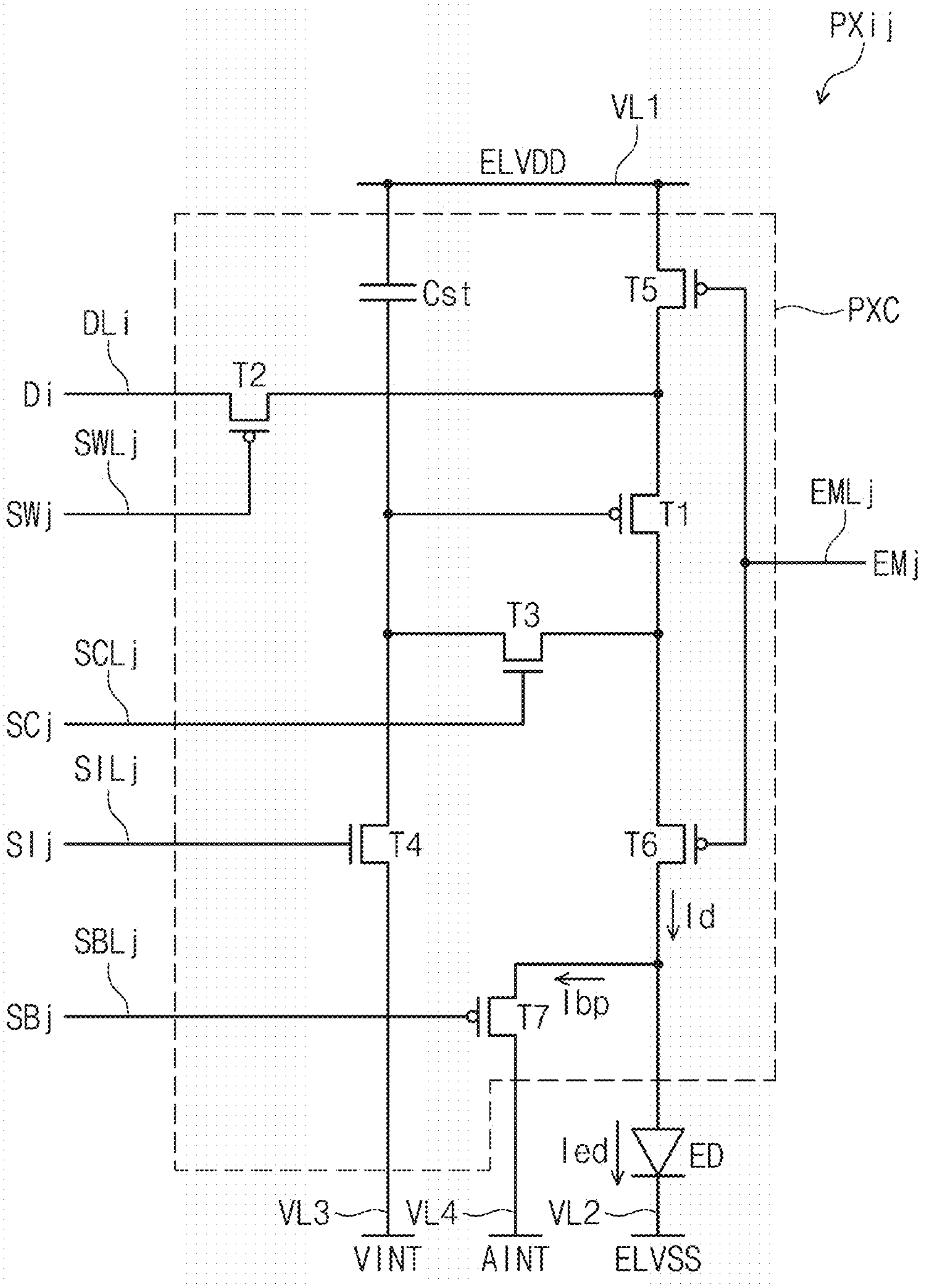
FIG. 4 is a circuit diagram of a pixel according to an embodiment of the present disclosure.
Figure 5:
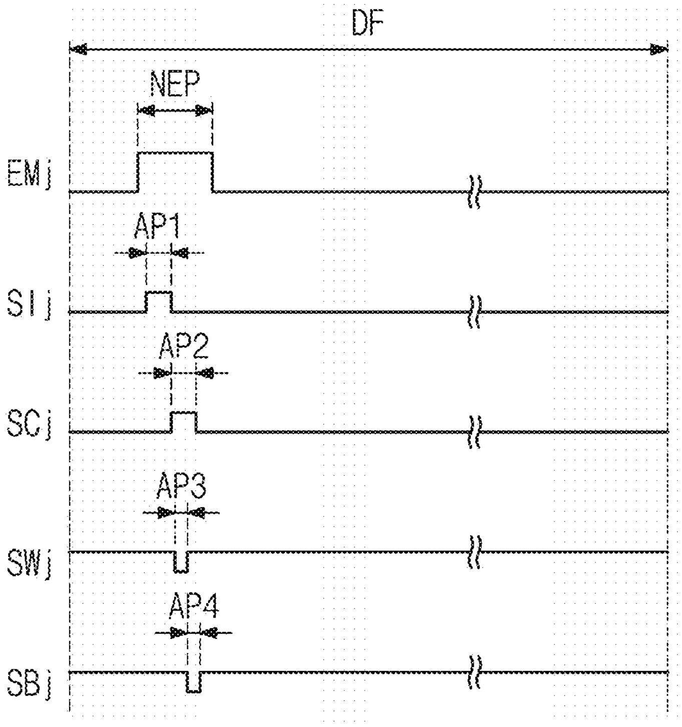
FIG. 5 is a timing diagram illustrating operation of a pixel according to an embodiment of the present disclosure.

FIG. 4 is a circuit diagram of a pixel according to an embodiment of the present disclosure, and FIG. 5 is a timing diagram of a pixel according to an embodiment of the present disclosure.

FIG. 4 illustrates an equivalent circuit diagram of one pixel PXij from among the plurality of pixels PX illustrated in FIG. 1. Since each of the plurality of pixels PX may have the same circuit structure, only the circuit structure of the pixel PXij will be representatively described and the details of the remaining pixels PX will be omitted in the following description.

Referring to FIG. 4, the pixel PXij is connected to an i-th data line DLi (hereinafter, referred to as a "data line") from among the data lines DL1 to DLm, and a j-th light emitting control line EMLj (hereinafter, referred to as a "light emitting control line) from among the light emitting control lines EML1 to EMLn. In this case, 'i' is an integer equal to or greater than '1' and equal to or less than 'm', and 'j' is an integer equal to or greater than '1' and equal to or less than 'n'. The pixel PXij is connected to a j-th initialization scan line SILj (hereinafter, an initialization scan line) from among the initialization scan lines SIL1 to SILn, a j-th write scan line SWLj (hereinafter, a write scan line) from among the write scan lines SWL1 to SWLn+1, and a j-th black scan line SBLj (hereinafter, a black scan line) from among a set of n black scan lines. In addition, the pixel PXij is connected to the j-th compensating scan line SCLj (hereinafter, referred to as a "compensating scan line") from among the compensating scan lines SCL1 to SCLn. Alternatively, the pixel PXij may be connected to a (j+1)-th write scan line instead of the j-th black scan line SBLj.

The pixel PXij includes the light emitting element ED and the pixel circuit unit PXC. The light emitting element ED may include a light emitting diode. The light emitting diode may include an organic light emitting material, an inorganic light emitting material, a quantum dot, or a quantum rod, in a light emitting layer.

The pixel circuit unit PXC in the embodiment of FIG. 4 includes first to seventh transistors T1, T2, T3, T4, T5, T6, and T7 and a capacitor Cst. Each of the first to seventh transistors T1 to T7 may be a transistor having a low-temperature polycrystalline silicon (LTPS) semiconductor layer. Some among the first to seventh transistors T1 to T7 may be P-type transistors, and the remaining transistors among the first to seventh transistors T1 to T7 may be N-type transistors. For example, the first, second, and fifth to seventh transistors T1, T2, and T5 to T7 among the first to seventh transistors T1 to T7 may be P-type transistors, and the third and fourth transistors T3 and T4 among the first to seventh transistors T1 to T7 may be N-type transistors including oxide semiconductors serving as semiconductor layers. However, the configuration of the pixel circuit unit PXC according to the present disclosure is not limited to an embodiment illustrated in FIG. 4. The pixel circuit unit PXC illustrated in FIG. 4 is provided only for the illustrative purpose. For example, the configuration of the pixel circuit unit PXC may be modified and implemented. For example, the first to seventh transistors T1 to T7 may be all P-type transistors or all N-type transistors.

The initialization scan line SILj, the compensating scan line SCLj, the write scan line SWLj, the black scan line SBLj, and the light emitting control line EMLj may respectively transmit a j-th initialization scan signal SIj (hereinafter, an initialization scan signal), a j-th compensation scan signal SCj (hereinafter, a compensation scan signal), a j-th write scan signal SWj (hereinafter, a write scan signal), a j-th black scan signal SBj (hereinafter, a black scan signal), and a j-th light emitting control signal EMj (hereinafter, a light emitting control signal) to the pixel PXij. The data line DLi transmits a data signal Di to the pixel PXij. The data signal Di may have a voltage level corresponding to the grayscale of a relevant input image signal of the input image signal RGB, which is input to the display device DD (see FIG. 3). First to fourth driving voltage lines VL1, VL2, VL3, and VL4 may respectively transmit the first driving voltage ELVDD, the second driving voltage ELVSS, the first initialization voltage VINT, and the second initialization voltage AINT to the pixel PXij.

The first transistor T1 includes a first electrode connected to the first driving voltage line VL1 through the fifth transistor T5, a second electrode electrically connected to an anode of the light emitting element ED through the sixth transistor T6, and a gate electrode connected to a first terminal of the capacitor Cst. The first transistor T1 may receive the data signal Di transmitted through the data line DLi in response to a switching operation of the second transistor T2 and may supply a driving current Id to the light emitting element ED.

The second transistor T2 includes a first electrode connected to the data line DLi, a second electrode connected to the first electrode of the first transistor T1, and a gate electrode connected to the write scan line SWLj. The second transistor T2 may turn on in response to the write scan signal SWj received through the write scan line SWLj and may then transmit the data signal Di, which is received through the data line DLi, to the first electrode of the first transistor T1.

The third transistor T3 includes a first electrode connected to the second electrode of the first transistor T1, a second electrode connected to the gate electrode of the first transistor T1, and a gate electrode connected to the compensating scan line SCLj. The third transistor T3 may turn on in response to the compensation scan signal SCj transmitted through the compensating scan line SCLj and may then connect the gate electrode of the first transistor T1 to the second electrode of the first transistor T1 such that the first transistor T1 is diode-connected.

The fourth transistor T4 includes a first electrode connected to a gate electrode of the first transistor T1, a second electrode connected to the third driving voltage line VL3 for transmitting the first initialization voltage VINT, and a gate electrode connected to the initialization scan line SILj. The fourth transistor T4 may turn on in response to the initialization scan signal SIj received through the initialization scan line SILj. An initialization operation initializes the potential of the gate electrode of the first transistor T1 by transmitting the first initialization voltage VINT through the fourth transistor T4 to the gate electrode of the first transistor T1.

The fifth transistor T5 may include a first electrode connected to the first driving voltage line VL1, a second electrode connected to the first electrode of the first transistor T1, and a gate electrode connected to the light emitting line EMLj.

The sixth transistor T6 includes a first electrode connected to the second electrode of the first transistor T1, a second electrode connected to the anode of the light emitting element ED, and a gate electrode connected to the light emitting control line EMLj.

The fifth transistor T5 and the sixth transistor T6 may simultaneously turn on in response to the light emitting control signal EMj received through the light emitting control line EMLj. When the fifth transistor T5 and the sixth transistor T6 are turned on, the first transistor T1 receives the first driving voltage ELVDD through the fifth transistor T5 and controls the current Id transmitted through the sixth transistor T6 to the light emitting element ED. As described further below, the capacitor Cst and the diode connection of the first transistor T1 through the third transistor T3 can be used compensate for the threshold voltage of the first transistor T1 and provide the current Id at a level corresponding to the data signal Di.

The seventh transistor T7 includes a first electrode connected to the second electrode of the sixth transistor T6, a second electrode connected to the fourth driving voltage line VL4 for transmitting the second initialization voltage AINT, and a gate electrode connected to the black scan line SBLj.

One terminal of the capacitor Cst is connected to the gate electrode of the first transistor T1, and another terminal of the capacitor Cst is connected to the first driving voltage line VL1 as described above. A cathode of the light emitting element ED may be connected to the second driving voltage line VL2 for transmitting the second driving voltage ELVSS.

Referring to FIGS. 4 and 5, the display panel DP (see FIG. 3) may display an image during a driving frame DF.

A plurality of scan signals SIj, SCj, SWj, and SBj may be activated during the driving frame DF. Specifically, the initialization scan signal SIj has a high level during a first active period AP1 of the driving frame DF, and the compensation scan signal SCj has the high level during a second active period AP2 of the driving frame DF. The write scan signal SWj has a low level during a third active period AP3 of the driving frame DF, and the black scan signal SBj has the low level during a fourth active period AP4 of the driving frame DF.

The light emitting control signal EMj may be deactivated during a non-emission period NEP of the driving frame DF. According to an embodiment of the present disclosure, the non-emission period NEP may be a high-level period of the light emitting control signal EMj. The non-emission period NEP may overlap the first to fourth active periods AP1, AP2, AP3, and AP4.

When the initialization scan signal SIj at the high level is provided through the initialization scan line SILj during the first active period AP1, the fourth transistor T4 turns on in response to the initialization scan signal SIj having the high level. The fourth transistor T4 when turned on transmits the first initialization voltage VINT to the gate electrode of the first transistor T1, and the gate electrode of the first transistor T1 is initialized to the first initialization voltage VINT.

Next, when the compensation scan signal SCj at the high level is provided through the compensating scan line SCLj during the second active period AP2, the third transistor T3 turns on. During the second active period AP2, the third transistor T3 being on diode connects the first transistor T1, which is forward biased due to initialization. The second active period AP2 of the compensation scan signal SCj may not overlap with the first active period AP1 of the initialization scan signal SIj. In addition, the first active period AP1 of the initialization scan signal SIj may precede the second active period AP2 of the compensation scan signal SCj.

According to an embodiment of the present disclosure, the second active period AP2 of the compensation scan signal SCj is defined as a period in which the compensation scan signal SCj has the high level, and the first active period AP1 of the initialization scan signal SIj is defined as a period in which the initialization scan signal SIj has the high level. When the third transistor T3 and the fourth transistor T4 are P-type transistors, the second active period AP2 of the compensation scan signal SCj is defined as a period in which the compensation scan signal SCj has the low level, and the first active period AP1 of the initialization scan signal SIj is defined as a period in which the initialization scan signal SIj has the low level.

The second active period AP2 may overlap the third active period AP3 in which the write scan signal SWj is generated at the low level. The second transistor T2 is turned on by the write scan signal SWj having the low level during the third active period AP3. Then, the compensating voltage "Di-Vth" obtained by subtracting the data signal Di supplied from the data line DLi from a threshold voltage "Vth" of the first transistor T1, is applied to the gate electrode of the first transistor T1. In other words, the potential of the gate electrode of the first transistor T1 may become the compensating voltage "Di-Vth".

The first driving voltage ELVDD and the compensating voltage "Di-Vth" may be applied at two terminals of the capacitor Cst, and the capacitor Cst may store charge corresponding to the voltage difference between the two terminals of the capacitor Cst.

Thereafter, the seventh transistor T7 may be turned on in response to the black scan signal SBj having the low level during the fourth active section AP4. A portion of the driving current Id may flow out of the seventh transistor T7, while functioning as the bypass current Ibp.

The light emitting element ED may emit light even if the minimum driving current of the first transistor T1 flows as the driving current Id, making it difficult for the pixel PXij to normally display a black image. Therefore, according to an embodiment of the present disclosure, the seventh transistor T7 in the pixel PXij may draw a portion of the minimum driving current of the first transistor T1, which serves as the bypass current Ibp, to a current path other than a current path toward the light emitting element ED. In this case, the minimum driving current of the first transistor T1 may refer to a current through the first transistor T1, under the condition that the first transistor T1 is turned off as the gate-source voltage of the first transistor T1 is less than the threshold voltage Vth. Accordingly, under the condition that the first transistor T1 is turned off, the minimum driving current (for example, the current of about 10 pA or less) flowing through the first transistor T1 might otherwise be transmitted to the light emitting element ED, such that a black image having the black grayscale is displayed. Accordingly, when the black image is displayed, a current (i.e., a light emitting current led) that flows through the light emitting element ED is less than the current Id by the quantity of the bypass current Ibp, which flows out of the seventh transistor T7. As a result, the light emitting element ED firmly expresses the black grayscale. When the pixel PXij expresses the black image, the driving current is at its minimum, and the bypass current Ibp is relatively large when compared to the minimum of the driving current Id. To the contrary, when an image, such as a normal image or a white image, is displayed, the bypass current Ibp is relatively small the driving current Id. Accordingly, use of the seventh transistor T7 may allow the pixel PXij to implement an accurate black grayscale. Accordingly, the contrast ratio of displayed images may be improved.

The light emitting control signal EMj supplied from the light emitting control line EMLj is changed from the high level to the low level at the end of the non-emission period NEP. The fifth transistor T5 and the sixth transistor T6 turn on in response to the light emitting control signal EMj having the low level. Then, the driving current Id is generated with a magnitude depending on the voltage difference between the gate voltage across the gate electrode of the first transistor T1 and the first driving voltage ELVDD, and the driving current Id is provided to the light emitting element ED through the sixth transistor T6.

Figure 6A:
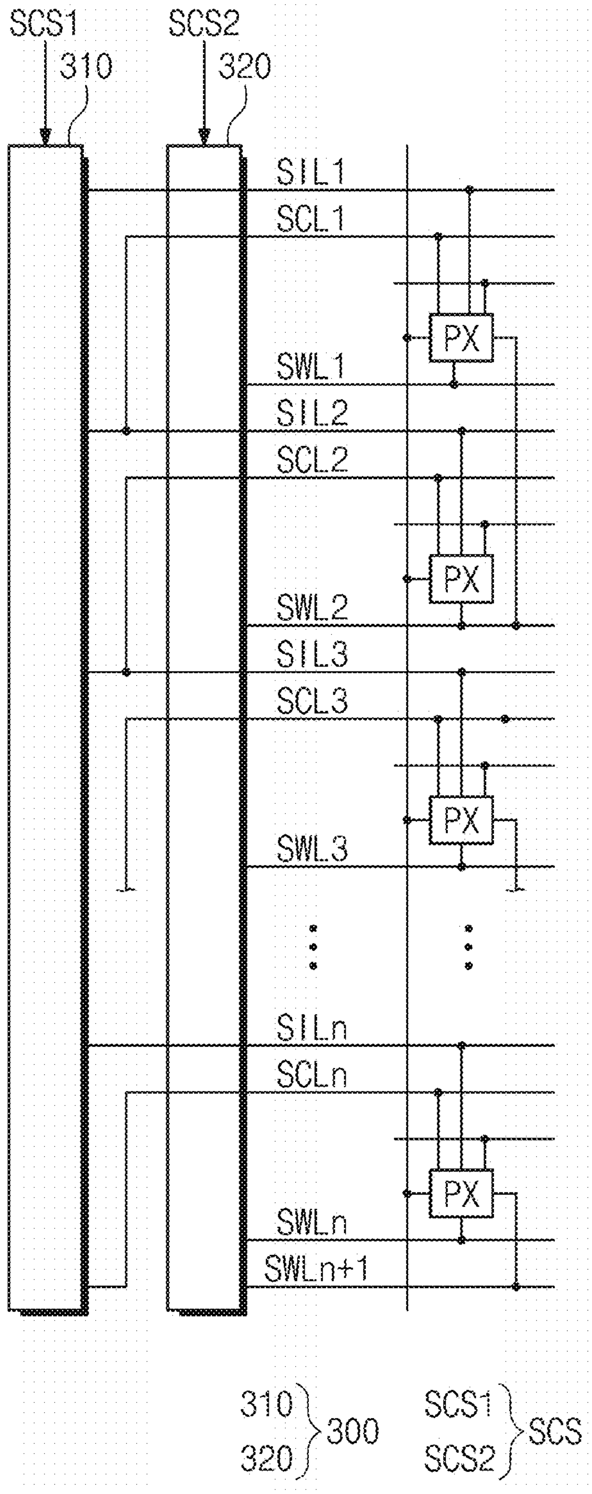
FIG. 6A is a block diagram of a scan driver according to an embodiment of the present disclosure.
Figure 6B:
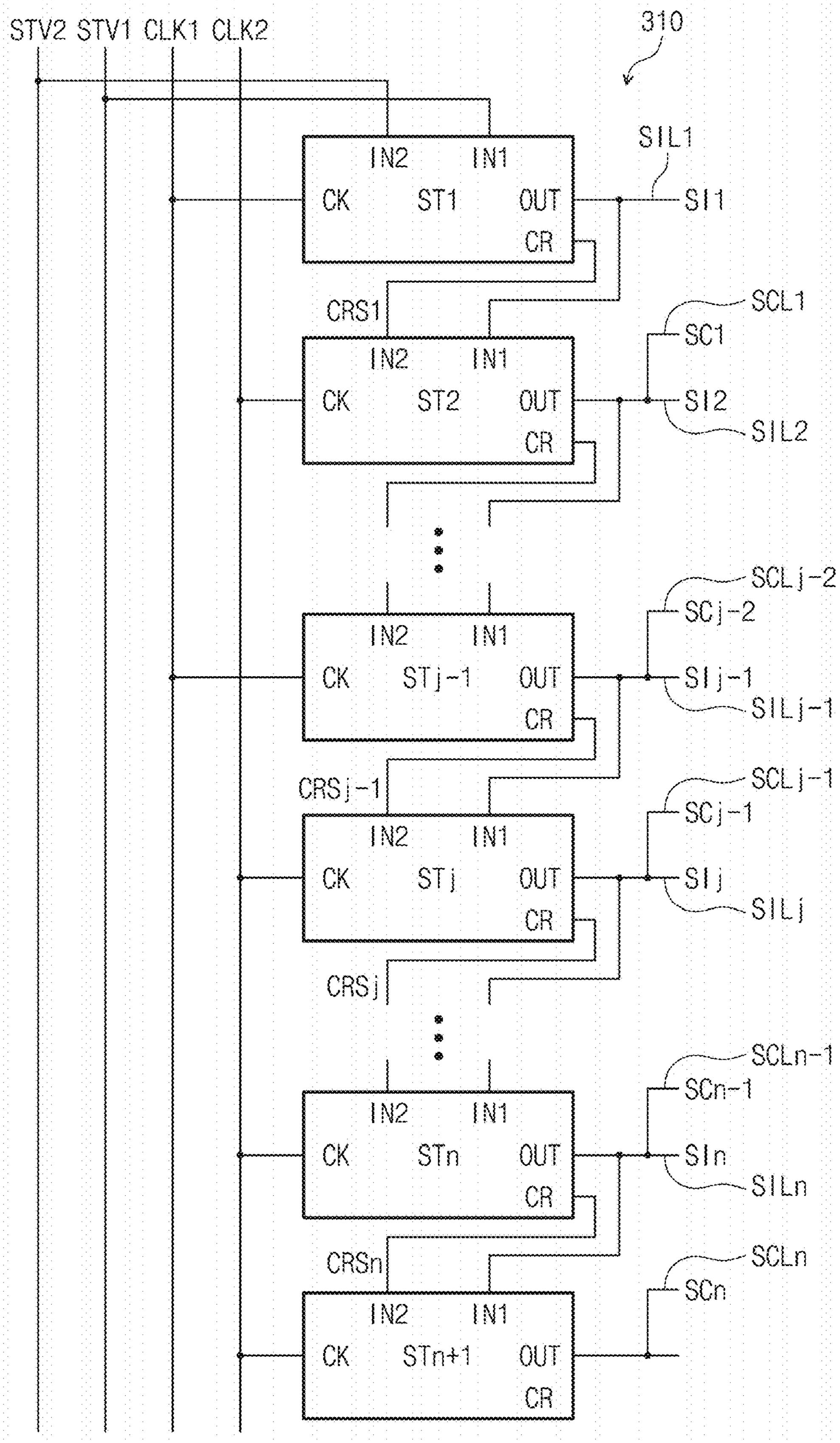
FIG. 6B is a block diagram of a first scan driving circuit illustrated in FIG. 6A.

FIG. 6A is a block diagram of a scan driver according to an embodiment of the present disclosure, and FIG. 6B is a block diagram of a first scan driving circuit illustrated in FIG. 6A.

Referring to FIG. 6A, the scan driver 300 includes a first scan driving circuit 310 and a second scan driving circuit 320. The first driving control signal SCS from the driving controller 100 (FIG. 3) includes a first scan control signal SCS1 applied to the first scan driving circuit 310 and a second scan control signal SCS2 applied to the second scan driving circuit 320. The first and second scan driving circuits 310 and 320 may output scan signals to scan lines in response to the first and second scan control signals SCS1 and SCS2, respectively. Although FIG. 6A illustrates a configuration in which the scan driver 300 includes two scan driving circuits 310 and 320, the number of scan driving circuits included in the scan driver 300 is not limited thereto.

The first scan driving circuit 310, in response to the first scan control signal SCS1, may output initialization scan signals to the initialization scan lines SIL1 to SILn, and output compensation scan signals to the compensating scan lines SCL1 to SCLn. The second scan driving circuit 320 may output write scan signals to the write scan lines SWL1 to SWLn+1 in response to the second scan control signal SCS2.

FIG. 6B illustrates the first scan driving circuit 310. Referring to FIG. 6B, the first scan driving circuit 310 may include a plurality of stages ST1 to STn+1, which are sequentially connected to each other. Each of stages ST1 to STn+1 may have substantially the same circuit configuration. For the convenience of explanation, FIG. 6B illustrates six stages ST1, ST2, STj−1, STj, STn, and STn+1. Some stages ST1 to STn among the plurality of stages ST1, ST2, STj−1, STj, STn, and STn+1 are connected to the initialization scan lines SIL1 to SILn. Some stages ST2 to STn+1 among the plurality of stages ST1 to STn+1 are connected to the compensating scan lines SCL1 to SCLn.

The second scan driving circuit 320 (see FIG. 6A) may have a configuration similar to that of the first scan driving circuit 310. In other words, the second scan driving circuit 320 may include a plurality of stages connected to the write scan lines SWL1 to SWLn+1 (see FIG. 6A), respectively.

Each of the stages ST1 to STn+1 may include a first input terminal IN1, a second input terminal IN2, a clock terminal CK, an output terminal OUT, and a carry terminal CR.

The output terminal OUT may output a scan signal. The scan signal may be the initialization scan signal or the compensation scan signal. The output terminals OUT of the plurality of stages ST1 to STn may be connected to the initialization scan lines SIL1 to SILn, respectively, and the output terminals OUT of the plurality of stages ST2 to STn+1 may be connected to the compensating scan lines SCL1 to SCLn, respectively. The output terminal OUT of each of the stages ST1 to STn may be connected to the first input terminal IN1 of a next stage. In detail, the output terminal OUT of the first stage ST1 is connected to the first input terminal IN1 of the second stage ST2, and the output terminal OUT of the (j−1)-th stage STj−1 is connected to the first input terminal IN1 of the j-th stage STj.

The first input terminal IN1 of each of the stages ST2 to STn+1 may receive a scan signal (hereinafter, referred to as a previous scan signal) output from the output terminal OUT of the previous stage. A first start signal STV1 may be input to the first input terminal IN1 in the first stage ST1. The first input terminal IN1 of the second stage ST2 may receive the first scan signal SI1 output from the output terminal OUT of the first stage ST1 as the previous scan signal. The first input terminal IN1 of the (n+1)-th stage STn+1 may receive the n-th scan signal Sin output from the output terminal OUT of the n-th stage STn as the previous scan signal.

The carry terminal CR of the stages ST1 to STn+1 may output a carry signal. The carry terminal CR of each of the stages ST1 to STn may be connected to the second input terminal IN2 of a next stage. In detail the carry terminal CR of the first stage ST1 is connected to the second input terminal IN2 of the second stage ST2, and the carry terminal CR of the (j−1)-th stage STj−1 is connected to the second input terminal IN2 of the j-th stage STj.

The second input terminal IN2 of each of the stages ST2 to STn+1 may receive a carry signal (hereinafter, referred to as a previous carry signal) output from the carry terminal CR of the previous stage. A second start signal STV2 may be input to the second input terminal IN2 in the first stage ST1. The second input terminal IN2 of the second stage ST2 may receive a first carry signal CRS1 output from the carry terminal CR of the first stage ST1 as the previous carry signal. The second input terminal IN2 of the (n+1)-th stage STn+1 may receive the n-th carry signal CRSn output from the carry terminal CR of the n-th stage STn as the previous scan signal.

The clock terminal CK of each of the stages ST1 to STn+1 may receive a first clock signal CLK1 or a second clock signal CLK2. According to an embodiment of the present disclosure, the first clock signal CLK1 may be provided to the clock terminals CK of odd-numbered stages ST1, STj−1, and STn+1, and the second clock signal CLK2 may be provided to the clock terminals CK of even-numbered stages ST2, STj, and STn. The first and second clock signals CLK1 and CLK2 may be signals having voltage swings with a preset cycle (e.g., a horizontal scanning period 1H) (see FIG. 8) during the driving frame DF (see FIG. 5). According to an embodiment of the present disclosure, the first and second clock signals CLK1 and CLK2 may have the same period but different phases from each other.

Figure 7:
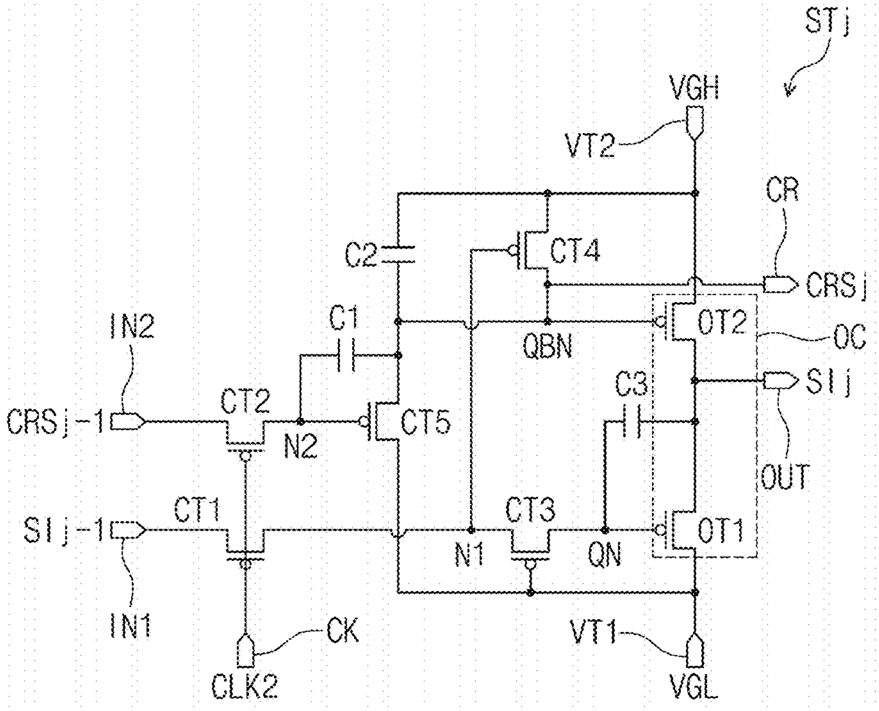
FIG. 7 is a circuit diagram of a j-th stage illustrated in FIG. 6B.

Each of the stages ST1 to STn+1 may further include a first voltage terminal VT1 (see FIG. 7) and a second voltage terminal VT2 (see FIG. 7). The first voltage terminal VT1 may be a terminal supplied with a low-voltage VGL (or a first voltage), and the second voltage terminal VT2 may be a terminal supplied with a high-voltage VGH (or a second voltage). Each of the low-voltage VGL and the high-voltage VGH may have a DC voltage level. The high-voltage VGH may be set to be a high-level of the scan signal, and the low-voltage VGL may be set to be in a low-level of the scan signal. The low-voltage VGL may have a voltage level lower than that of the high-voltage VGH.

The first voltage terminals VT1 of the stages ST1 to STn+1 may be connected to each other, and the second voltage terminals VT2 of the stages ST1 to STn+1 may be connected to each other.

Hereinafter, the circuit configuration of the j-th stage STj as an example of the stages ST1 to STn+1 will be described with reference to FIG. 7. Since each of the stages ST1 to STn+1 has the same circuit configuration, a description of the circuit configuration of other stages will be omitted.

Figure 8:
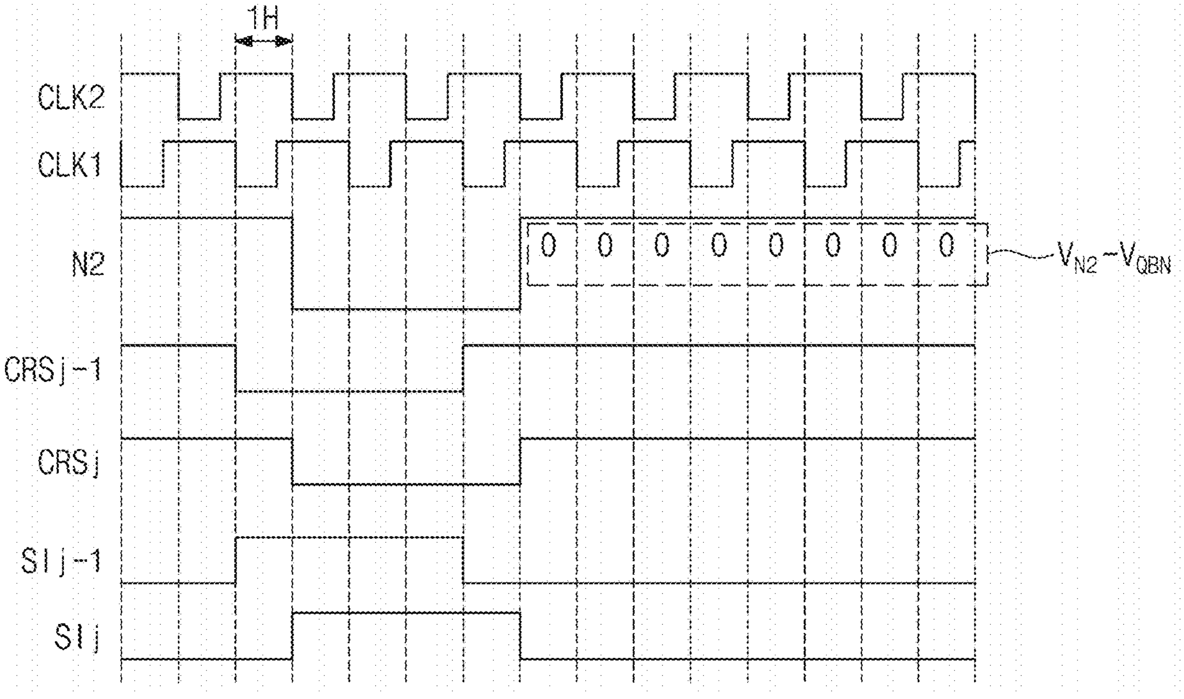
FIG. 8 is a waveform illustrating the operation of a j-th stage illustrated in FIG. 7.

FIG. 7 is a circuit diagram of the j-th stage illustrated in FIG. 6B. FIG. 8 is a waveform illustrating the operation of the j-th stage illustrated in FIG. 7.

Referring to FIGS. 6B and 7, the j-th stage STj includes first to fifth control transistors CT1 to CT5, first to third capacitor C1 to C3, and an output circuit OC.

The first control transistor CT1 is connected between the first input terminal IN1, which receives the previous scan signal (i.e., the (j−1)-th scan signal SIj−1) from the previous stage (i.e., the (j−1)-th stage STj−1), and a first node N1, and the first control transistor CT1 operates in response to the second clock signal CLK2 provided through the clock terminal CK. The first control transistor CT1 includes a first electrode connected to the first input terminal IN1, a second electrode connected to the first node N1, and a third or gate electrode connected to the clock terminal CK. The second control transistor CT2 is connected between the second input terminal IN2, which receives the previous carry signal (i.e., the (j−1)-th carry signal CRSj−1) from the previous stage STj−1, and a second node N2, and the second control transistor CT2 operates in response to the second clock signal CLK2 provided through the clock terminal CK. The second control transistor CT2 includes a first electrode connected to the second input terminal IN2, a second electrode connected to the second node N2, and a third or gate electrode connected to the clock terminal CK. According to an embodiment of the present disclosure, each of the first and second control transistors CT1 and CT2 may include an LTPS semiconductor layer and may be a P-type transistor.

The third control transistor CT3 is connected between the first node N1 and a first control node QN and operates in response to the low-voltage VGL (or the first voltage) provided through the first voltage terminal VT1. The third control transistor CT3 includes a first electrode connected to the first node N1, a second electrode connected to the first control node QN, and a third or gate electrode connected to the first voltage terminal VT1. The fourth control transistor CT4 is connected between a second control node QBN and the second voltage terminal VT2 and operates in response to the potential of the first node N1. The high-voltage VGH (or the second voltage) is applied to the second voltage terminal VT2. The low-voltage VGL may have a voltage level lower than that of the high-voltage VGH. The fourth control transistor CT4 includes a first electrode connected to the second voltage terminal VT2, a second electrode connected to the second control node QBN, and a third or gate electrode connected to the first node N1. The carry terminal CR of the stage is connected to the second control node QBN. According to an embodiment of the present disclosure, each of the third and fourth control transistors CT3 and CT4 may include the LTPS semiconductor layer and may be a P-type transistor.

The fifth control transistor CT5 is connected between the second control node QBN and the first voltage terminal VT1 and operates in response to the potential of the second node N2. The fifth control transistor CT5 includes a first electrode connected to the second control node QBN, a second electrode connected to the first voltage terminal VT1, and a third or gate electrode connected to the second node N2. The fifth control transistor CT5 may include the LTPS semiconductor layer and may be a P-type transistor.

The first capacitor C1 is connected between the second node N2 and the second control node QBN, and the second capacitor C2 is connected between the second control node QBN and the second voltage terminal VT2.

The output circuit OC includes a first output transistor OT1 and a second output transistor OT2, which are connected to the output terminal OUT. The first output transistor OT1 is connected between the output terminal OUT and the first voltage terminal VT1, and operates in response to the potential at the first control node QN. The first output transistor OT1 includes a first electrode connected to the output terminal OUT, a second electrode connected to the first voltage terminal VT1, and a third or gate electrode connected to the first control node QN. The second output transistor OT2 is connected between the output terminal OUT and the second voltage terminal VT2 and operates in response to the potential of the second control node QBN. The second output transistor OT2 includes a first electrode connected to the second voltage terminal VT2, a second electrode connected to the output terminal OUT, and a third or gate electrode connected to the second control node QBN. According to an embodiment of the present disclosure, each of the first and second control transistors OT1 and OT2 may include the LTPS semiconductor layer and may be a P-type transistor.

The third capacitor C3 is connected between the first control node QN and the output terminal OUT.

Referring to FIGS. 7 and 8, the first and second control transistors CT1 and CT2 are turned on during the low-level period of the second clock signal CLK2. The first control transistor CT1 when on provides the previous scan signal (i.e., the (j−1)-th scan signal SIj−1) from the first input terminal IN1 to the first node N1. Accordingly, the potential of the first node N1 rises to a high level in response to the (j−1)-th scan signal SIj−1 being at the high level. When the potential at the first node N1 rises to the high level, the potential of the first control node QN rises to the high level through the third control transistor CT3, which is turned on. Even if the second clock signal CLK2 switches to the high level during the high-level period of the (j−1)-th scan signal SIj−1, the potential at the first node N1 and the first control node QN may be maintained at the high level, e.g., by the third capacitor C3. When the potential at the first node N1 and the first control node QN have the high level, the first output transistor OT1 is turned off.

When the potential at the first node N1 rises to the high level, the fourth control transistor CT4 may be turned off. As the fourth control transistor CT4 is turned off, the second control node QBN and the second voltage terminal VT2 may be electrically disconnected.

The second control transistor CT2 provides the previous carry signal (i.e., the (j−1)-th carry signal CRSj−1) from the second input terminal IN2 to the second node N2 during the low-level period of the clock signal CLK2. Accordingly, the potential VN2 of the second node N2 may be lowered to a low level in response to the (j−1)-th carry signal CRSj−1. Even if the second clock signal CLK2 is switched to the high level during the low-level period of the (j−1)-th carry signal CRSj−1, the potential VN2 of the second node N2 may be maintained at the low level. When the potential VN2 at the second node N2 is at the low level, the fifth control transistor CT5 may be turned on. The fifth transistor CT5 being turned on applies the low-level voltage VGL to the second control node QBN, and in the state that the fourth control transistor CT4 is turned off, the potential $V_{QBN}$ at the second control node QBN may be lowered to the low-level voltage VGL.

When the potential $V_{QBN}$ at the second control node QBN has the low level, the second output transistor OT2 is turned on. Accordingly, the high-level voltage VGH may be output to the output terminal OUT through the second output transistor OT2, which is then turned on. In other words, the j-th scan signal SIj may be output in the high level from the time point at which the potential $V_{QBN}$ at the second control node QBN is lowered to be the low level while the control node QN is at the high level.

In this case, the second control node QBN may be connected to the carry terminal CR of the j-th stage STj. Therefore, the potential $V_{QBN}$ of the second control node QBN may be output at the carry terminal CR as the j-th carry signal CRSj. In other words, when the potential $V_{QBN}$ of the second control node QBN is at the low level, the j-th scan signal SIj is output at a high level from the output terminal OUT through the second output transistor OT2 being turned on, so that the j-th scan signal SIj and the j-th carry signal CRSj may have inverted phases.

When the first and second control transistors CT1 and CT2 are turned on during the low-level period of the second clock signal CLK2 after the (j−1)-th scan signal SIj−1 is switched to be in the low level, potential at the first node N1 and potential at the first control node QN may be lowered to be in the low level. The potential at the first node N1 being lowered to the low level turns on the fourth control transistor CT4. As the fourth control transistor CT4 is turned on, the potential at the second control node QBN may rise to the high-level voltage VGH. Accordingly, the j-th carry signal CRSj may then be switched to be in the high level. The second output transistor OT2 is turned off in response to the potential $V_{QBN}$ of the second control node QBN having the high level, and the first output transistor OT1 is turned on in response to the potential at the first control node QN having the low level. The first output transistor OT1 being turned on may pull the voltage on the output terminal OUT to the low-level voltage VGL. Accordingly, the j-th scan signal SIj in the low state may be output to the output terminal OUT during a deactivation period.

During a period in which the j-th carry signal CRSj is maintained in the high level (i.e., the deactivation period of the j-th scan signal SIj), even if the second clock signal CLK2 toggles from the high level to the low level or from the low level to the high level, the potential VN2 of the second node N2 to which the first capacitor C1 is connected may be stably maintained in a high state. In this case, the deactivation period of the j-th scan signal SIj may correspond to the high-level period (or deactivation period) of the second node N2. In particular, even when the second control transistor CT2 is turned on during the low-level period of the second clock signal CLK2, the (j−1)-th carry signal CRSj−1 is applied to the second node N2. During the deactivation period of the j-th scan signal SIj, the (j−1)-th carry signal CRSj−1 and the j-th carry signal CRSj have substantially the same potential except for one horizontal scanning period 1H. At other times, even if the second clock signal CLK2 toggles, the first capacitor C1 may neither charge nor discharge because the potential difference $V_{N2}-V_{QBN}$ between the second node N2 and the second control node QBN is maintained at zero ‘0’. As a result, the power consumption during the deactivation period of each of the stages ST1 to STn+1 may be reduced, and the overall power consumption of the scan driver 300 and the display device DD employing the same may be reduced.

According to the present disclosure, in each stage of the scan driver, even if the clock signal is toggled during a deactivation period of a second node, as the potential difference between the second node and the second control node is substantially maintained to be zero ‘0’, discharging or charging the first capacitor does not occur. Accordingly, power consumption may be reduced in each stage during the deactivation period, which results in reducing the total power consumption of the scan driver and the display device employing the scan driver.

Although an embodiment of the present disclosure has been described for illustrative purposes, those skilled in the art will appreciate that various modifications, and substitutions are possible, without departing from the scope and spirit of the accompanying claims. Accordingly, the technical scope of the present disclosure is not limited to the detailed description of this specification but should be defined by the claims.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A scan driver comprising:

a plurality of stages sequentially connected to each other, wherein each stage includes:

a first control transistor connected between a first input terminal and a first node, the first control transistor operating in response to a clock signal provided through a clock terminal;

a second control transistor connected between a second input terminal and a second node the second control transistor operating in response to the clock signal;

a third control transistor connected between the first node and a first control node, the third control transistor operating in response to a first voltage provided through a first voltage terminal;

a fourth control transistor connected between a second voltage terminal and a second control node, the fourth control transistor operating in response to a potential at the first node;

a fifth control transistor electrically connected between the second control node and the first voltage terminal, the fifth control transistor operating in response to a potential at the second node;

a first capacitor connected between the second node and the second control node; and an output circuit configured to output a scan signal in response to a potential at the first control node and a potential at the second control node.

2. The scan driver of claim 1, wherein the second control node of each of the stages is connected to a carry terminal, and wherein the carry terminal outputs the potential at the second control node as a carry signal.

3. The scan driver of claim 2, wherein the carry terminal is connected to the second input terminal of a next stage.

4. The scan driver of claim 2, wherein a potential difference between the second node and the second control node is substantially maintained at zero during a deactivation period of the second node.

5. The scan driver of claim 2, wherein the output circuit includes:

a first output transistor connected between an output terminal and the first voltage terminal, the first output transistor operating in response to the potential at the first control node; and a second output transistor connected between the output terminal and the second voltage terminal, the second output transistor operating in response to the potential at the second control node.

6. The scan driver of claim 5, wherein the output terminal is connected to the first input terminal of a next stage.

7. The scan driver of claim 6, wherein the first input terminal of a first stage among the plurality of stages receives a first start signal as a previous scan signal, and wherein the second input terminal of the first stage receives a second start signal as a previous carry signal.

8. The scan driver of claim 6, wherein each of the stages further includes:

a second capacitor connected between the fifth control transistor and the second voltage terminal; and a third capacitor connected between the first control node and the output terminal.

9. The scan driver of claim 1, wherein the first voltage applied to the first voltage terminal has a voltage level lower than a voltage level of a second voltage applied to the second voltage terminal.

10. The scan driver of claim 1, wherein the first control transistor includes:

a first electrode connected to the first input terminal;

a second electrode connected to the first node; and a third electrode to receive the clock signal, and wherein the second control transistor includes:

a first electrode connected to the second input terminal;

a second electrode connected to the second node; and a third electrode to receive the clock signal.

11. The scan driver of claim 10, wherein the third control transistor includes:

a first electrode connected to the first node;

a second electrode connected to the first control node; and a third electrode connected to the first voltage terminal, and wherein the fourth control transistor includes:

a first electrode connected to the second voltage terminal;

a second electrode connected to the second control node; and a third electrode connected to the first node.

12. The scan driver of claim 11, wherein the fifth control transistor includes:

a first electrode connected to the second control node;

a second electrode connected to the first voltage terminal; and a third electrode connected to the second node, and wherein the first capacitor is between the first electrode of the fifth control transistor and the third electrode of the fifth control transistor.

13. The scan driver of claim 1, wherein the clock signal includes a first clock signal and a second clock signal having different phase from each other, wherein clock terminals of odd-numbered stages among the plurality of stages receive the first clock signal, and wherein clock terminals of even-numbered stages among the plurality of stages receive the second clock signal.

14. An electronic device comprising:

a display panel including a pixel;

a data driver configured to output a data signal to the display panel; and a scan driver including a plurality of stages sequentially connected to each other to output a scan signal to the display panel, wherein each stage includes:

a first control transistor connected between a first input terminal and a first node, the first control transistor operating in response to a clock signal provided through a clock terminal;

a second control transistor connected between a second input terminal and a second node, the second control transistor operating in response to the clock signal;

a third control transistor connected between the first node and a first control node, the third control transistor operating in response to a first voltage provided through a first voltage terminal;

a fourth control transistor connected between a second voltage terminal and a second control node, the fourth control transistor operating in response to a potential at the first node;

a fifth control transistor electrically connected between the second control node and the first voltage terminal, the fifth control transistor operating in response to a potential at the second node;

a first capacitor connected between the second node and the second control node; and an output circuit configured to output a scan signal in response to a potential at the first control node and a potential at the second control node.

15. The electronic device of claim 14, wherein the second control node of each of the stages is connected to a carry terminal, and wherein the carry terminal outputs the potential at the second control node as a carry signal.

16. The electronic device of claim 15, wherein the carry terminal is connected to the second input terminal of a next stage.

17. The electronic device of claim 15, wherein a potential difference between the second node and the second control node is substantially maintained at zero during a deactivation period of the second node.

18. The electronic device of claim 15, wherein the output circuit includes:

a first output transistor connected between an output terminal and the first voltage terminal, the first output transistor operating in response to the potential at the first control node; and a second output transistor connected between the output terminal and the second voltage terminal, the second output transistor operating in response to the potential at the second control node.

19. The electronic device of claim 18, wherein the output terminal is connected to the first input terminal of a next stage.

20. The electronic device of claim 19, wherein the first input terminal of a first stage among the plurality of stages receives a first start signal as a previous scan signal, and wherein the second input terminal of the first stage receives a second start signal as a previous carry signal.

* * * * *